US009444517B2

(12) United States Patent
Teggatz et al.

(10) Patent No.: US 9,444,517 B2
(45) Date of Patent: Sep. 13, 2016

(54) COUPLED INDUCTOR POWER TRANSFER SYSTEM

(75) Inventors: Ross Teggatz, McKinney, TX (US); Wayne Chen, Plano, TX (US); Amer Atrash, Richardson, TX (US)

(73) Assignee: TRIUNE SYSTEMS, LLC, Plano, TX (US)

( * ) Notice: Subject to any disclaimer, the term of this patent is extended or adjusted under 35 U.S.C. 154(b) by 466 days.

(21) Appl. No.: 13/309,406

(22) Filed: Dec. 1, 2011

(65) Prior Publication Data
US 2012/0139357 A1    Jun. 7, 2012

Related U.S. Application Data

(60) Provisional application No. 61/418,496, filed on Dec. 1, 2010.

(51) Int. Cl.
| H01F 27/42 | (2006.01) |
| H01F 37/00 | (2006.01) |
| H01F 38/00 | (2006.01) |
| H04B 5/00  | (2006.01) |
| H04L 9/32  | (2006.01) |
| H02J 5/00  | (2016.01) |
| H02J 17/00 | (2006.01) |
| H01F 38/14 | (2006.01) |

(52) U.S. Cl.
CPC ............ H04B 5/0031 (2013.01); H02J 5/005 (2013.01); H04B 5/0037 (2013.01); H04L 9/32 (2013.01); H01F 38/14 (2013.01); H02J 17/00 (2013.01)

(58) Field of Classification Search
CPC ........... H02J 5/005; H02J 7/025; H02J 7/00; H01F 38/14; A61N 1/36; A61M 31/00
USPC ........... 307/104, 140, 80, 82; 320/137, 108; 330/310; 706/412, 67
See application file for complete search history.

(56) References Cited

U.S. PATENT DOCUMENTS

| 8,497,658 B2 * | 7/2013 | Von Novak ............. H02J 7/025 320/108 |
| 2009/0243394 A1 * | 10/2009 | Levine .................... H02J 5/005 307/104 |
| 2010/0036773 A1 * | 2/2010 | Bennett ............. G06Q 20/3674 705/67 |
| 2010/0214024 A1 * | 8/2010 | Jones .................... H03F 1/0205 330/310 |
| 2011/0230857 A1 * | 9/2011 | Herbst ..................... A61N 1/32 604/503 |
| 2012/0007679 A1 * | 1/2012 | Burgener ............... H01Q 23/00 330/277 |

* cited by examiner

*Primary Examiner* — Rexford Barnie
*Assistant Examiner* — Jagdeep Dhillon
(74) *Attorney, Agent, or Firm* — Jackson Walker LLP; Christopher J. Rourk

(57) ABSTRACT

Coupled inductor systems are disclosed in which transmitter and receiver inductors, or coils, are coupled in a configuration for wirelessly transferring power and/or data among them. In preferred implementations, the systems are used for transmitting both power and data in pairs of coupled coils. Primary side circuits in preferred embodiments of the systems of the invention employ Class D or Class G amplifiers.

23 Claims, 4 Drawing Sheets

Class-G transmitter driver

Class-G transmitter driver. SMPS provides an efficient power supply to the LDO. The SMPS can either source its power from a DC or AC source. The LDO is operating just at the edge of dropout, so there is not much power loss.

The LDO acts as a filter to minimize EMI (radiated emissions)

Class-D transmitter driver 400

Transmitter shielded.
Use class-d to get good efficiency
Class-d output has filter to filter the high-frequency (PWM) switching signals – this switching frequency is much higher than the sinewave frequency across the coils
Filtering is accomplished by a network of L, R, and C.

US 9,444,517 B2

COUPLED INDUCTOR POWER TRANSFER SYSTEM

PRIORITY ENTITLEMENT

This application is entitled to priority based on Provisional Patent Application Ser. No. 61/418,496 filed on Dec. 1, 2010, which is incorporated herein for all purposes by this reference. This application and the Provisional Patent Application have at least one common inventor.

TECHNICAL FIELD

The invention relates to coupled inductor systems. More particularly, the invention relates to coupled inductor systems for use in wireless power and data transfer applications. In preferred embodiments employed in wireless power applications, the invention relates to the more efficient utilization of energy resources.

BACKGROUND OF THE INVENTION

Inductive coupling is an effect used to transfer electrical energy from one circuit to an adjacent circuit through inductive coils. A variable current on a primary coil is used to create a varying magnetic field, and thus a voltage, in a secondary coil. Wireless charging systems employing inductive coupling are useful for transferring energy from one device to another. Such systems are used for supplying power, charging batteries, and in some cases also for transferring data. Challenges inherent in such systems include providing efficiency in transferring power. Inefficient systems generate excess heat and are limited in their maximum power transfer capability.

Due to these and other problems and potential problems, improved coupled inductor systems would be useful and advantageous contributions to the arts.

SUMMARY OF THE INVENTION

In carrying out the principles of the present invention, in accordance with preferred embodiments, the invention provides advances in the arts with novel apparatus directed to the transfer of power and/or data using inductive couplings. In preferred embodiments, systems include capabilities for power and/or data transfer. Preferably, the coupled coils of systems of the invention are not permanently physically interconnected.

According to aspects of the invention, examples of preferred embodiments include multiple coil couple inductor systems including at least a primary side coil and a secondary side coil for completing an inductive coupling with the primary side. The coils are preferably not permanently physically affixed to one another and are interchangeable, e.g., a secondary side coil can preferably be removed from proximity with a primary side coil and replaced with a different secondary side coil. When positioned in proximity, the primary and secondary side coils are electromagnetically, but not physically coupled such that one or more signals may be passed between the coils.

According to aspects of the invention, in an example of presently preferred embodiments, a coupled inductor system for wireless power transfer includes a primary side with a driver connected for driving a primary side inductor. A secondary side is provided with a secondary side inductor and is adapted for receiving a sine wave power signal transmitted to it through the primary side inductor.

According to aspects of the invention, preferred embodiments also include systems as described immediately above with Class G amplifier drivers.

According to aspects of the invention, preferred embodiments also include systems as described immediately above with Class D amplifier drivers.

According to aspects of the invention, in preferred embodiments, coupled inductor systems for wireless power transfer are also equipped for providing feedback from the secondary side to the primary side.

According to aspects of the invention, preferred embodiments of coupled inductor systems for wireless power transfer also include data transmission functionality.

The invention has advantages including but not limited to one or more of, improved coupled inductor system power transfer, improved data transmission functionality, and reduced costs. These and other potential advantageous, features, and benefits of the present invention can be understood by one skilled in the arts upon careful consideration of the detailed description of representative embodiments of the invention in connection with the accompanying drawings.

BRIEF DESCRIPTION OF THE DRAWINGS

The present invention will be more clearly understood from consideration of the following detailed description and drawings in which.

Figure 1:
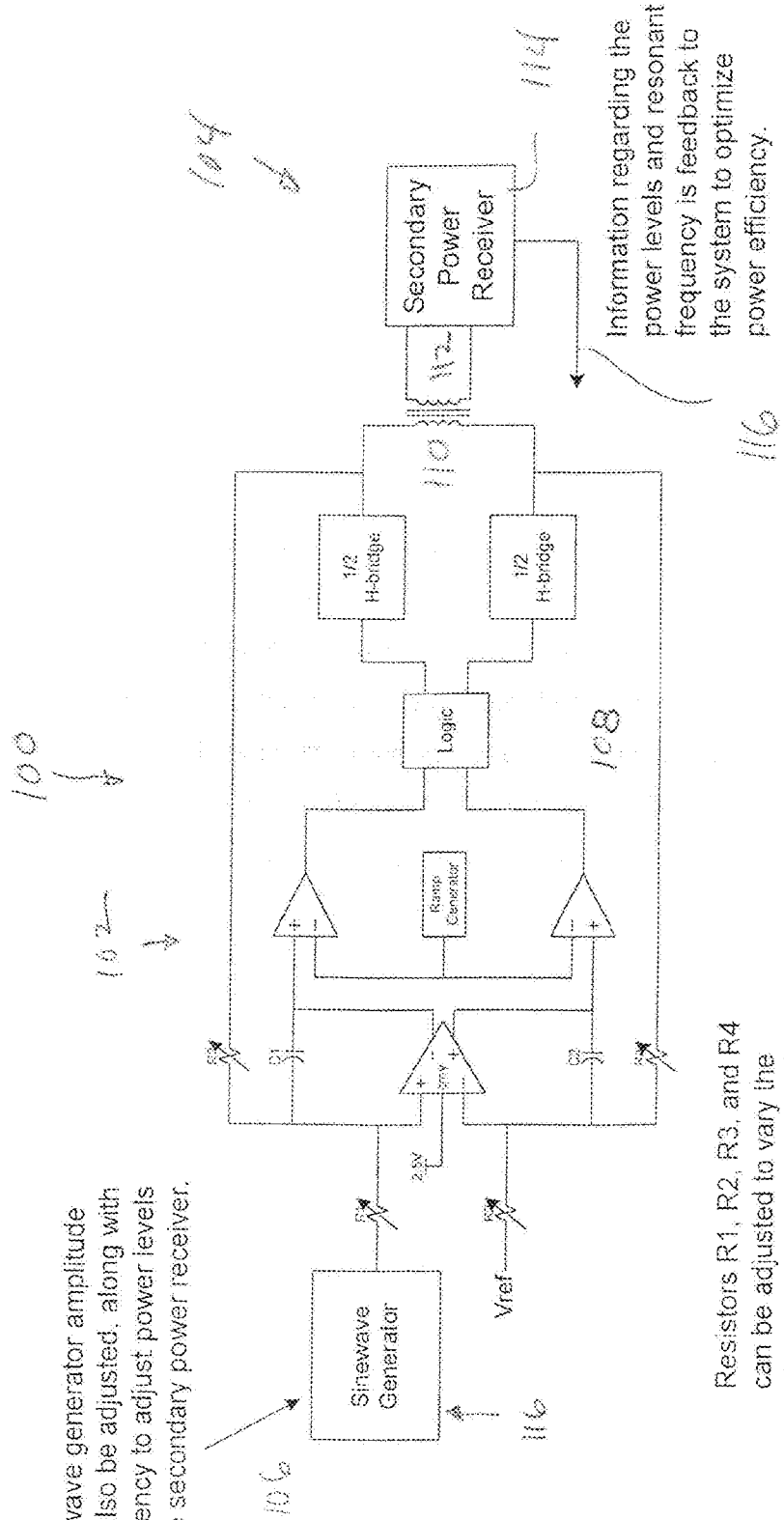
FIG. 1 is a simplified schematic diagram of a coupled inductor power transfer system illustrating an example of a preferred embodiment of the invention.

References in the detailed description correspond to like references in the various drawings unless otherwise noted. Descriptive and directional terms used in the written description such as right, left, back, top, bottom, upper, side, et cetera, refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

The present patent application is related to U.S. patent application Ser. No. 13/045,493 which shares at least one common inventor with the present application and has a common assignee. Said related application is hereby incorporated herein for all purposes by this reference.

If a load is connected to the secondary coil of a coupled inductor system, an electric current flows in the secondary coil, and electrical energy is then transferred from the primary coil through the secondary coil, and ultimately to a load connected to the secondary side. Generally, secondary side systems are designed to resonate at a particular frequency. This allows for more efficient transfer of energy at that particular frequency. In systems known in the art, the primary side coil is excited with a square wave, with the result that energy is radiated at multiple frequencies. Efforts to use a square wave result in wasted energy and radiated emissions. Energy is inevitably radiated at frequencies other than the intended square wave fundamental frequency, e.g., at harmonic frequencies, creating a multiple frequency input to the primary side inductor, which is additionally distorted due to coupling effects from the secondary side. Energy that is not at the particular resonant frequency of the secondary side system is dissipated or transferred with reduced efficiency. Regulation of the power transfer in such a system is achieved by modulating either the duty cycle, or the frequency of the primary side driver. In either case, the result is a non-optimized transfer of power in the system. Existing systems that control power transfer by modulating input power use a two-stage solution. The first stage provides the power conversion from some supply voltage to an adjustable voltage. The second stage is a full-bridge or half-bridge driver that drives the coils. The first stage in these systems introduces additional complexity, component count, and power dissipation.

The inventors have designed a system in which the primary side coil is driven in such a way that it radiates energy in the narrowest possibly frequency band, and in which the driver control is modulated in such a way as to maintain good frequency performance of the system. This is achieved in a system designed for driving the primary coil using a sine function. Power transfer is controlled by varying the amplitude of the primary side driver. Several alternative embodiments have been developed for generating a sine wave on the primary side coil. The presently preferred embodiments that address problems of primary side driver performance use a Class-D or Class-G amplifier to drive the primary side coil.

An example of a preferred embodiment of a coupled inductor system for wireless power transfer according to the invention is shown in FIG. 1. The system 100 includes a primary side 102 for providing power to a secondary side 104 receiver. On the primary side 102, a sine wave generator 106 is provided as a driver. Preferably, the sine wave generator 106 is capable of adjustment in terms of frequency and amplitude in order to adjust transmissions to the secondary side 104. Suitable startup circuitry 108 is provided to allow the system 100 to achieve appropriate bias levels prior to driving the primary side inductor coil 110. This provides the additional advantage of providing a smooth startup that mitigates or eliminates wasted energy and radiated emissions. Adjustable resistors, e.g., R1, R2 R3, R4, are preferably provided in order to regulate the sine wave amplitude for output at the primary side inductor 110. The secondary side 104 includes a secondary side inductor 112, inductively coupled to the primary side inductor 110 for receiving the sine wave output of the primary side 102. Preferably, the secondary side 104 also includes circuitry 114 suitable for generating feedback signals 116 such as power levels, load levels, and secondary side frequency, for use in making adjustments to the output of the sine wave generator 106.

It should be understood that the system 100 frequency may be adjusted in efforts to optimize power transfer. If the amplitude of the output is measured at different frequencies and found to vary in amplitude, then the frequency with the highest amplitude signal is recognized to represent the resonant point of the system 100 and may be used to optimize operation. The sine wave frequency at the primary side 102 sine wave generator 106 can also be adjusted to optimize the coupling to the secondary side 104. Preferably, during initial coupling, the frequency of the sine wave is varied, and amplitude and/or power transfer, preferably both, are measured in the secondary side 104 at various frequencies. The feedback information 116 thus obtained may then be used to determine the optimal frequency of the sine wave output of the driver 106 for maximum power transfer. The system 100 can also employ a multi-step setup using multiple parameters. For example, on initial power-up or characterization, the primary side 102 of the system 100 can determine its resonant frequency by iteratively adjusting frequency and measuring output at the primary side coil 110. After the power transfer link is established at some defined frequency, the system 100 operating frequency can shift back to the resonant frequency based on feedback 116 from the secondary side 104 for improved efficiency. At this point, the power transfer can be controlled by adjusting the sine wave generator 106 amplitude and maintaining operation at the resonant frequency. Instead of using the resonant frequency, the system 100 can optionally make use of one or more other selected frequency determined to be a preferred frequency based on efficiency, power transfer, EMI, or other parameter(s).

This exemplary coupled inductor system 100 for wireless power transfer illustrates several advantages common to preferred embodiments of the invention. Aspects of the invention lead to improved control and efficiency, including, low impedance switches, accurate signal generation, feedback to compensate for variations in secondary side load, precise control of the primary side coil voltage amplitude, and additional data transfer capabilities. As the energy transfer is improved, the coil resistance can be higher making a better system in terms of manufacturability and lower cost. The feedback loop provided to assist in generating the primary side sine wave can be closed using voltage or current feedback or some combination of both. An additional advantage of this system is that it provides the ability to generate an effective coil drive voltage or sine wave amplitude that is lower than the input voltage of the system. This eliminates the need for a separate power conversion stage that would be necessary to modulate input voltage to the primary coil driver.

Figure 2:
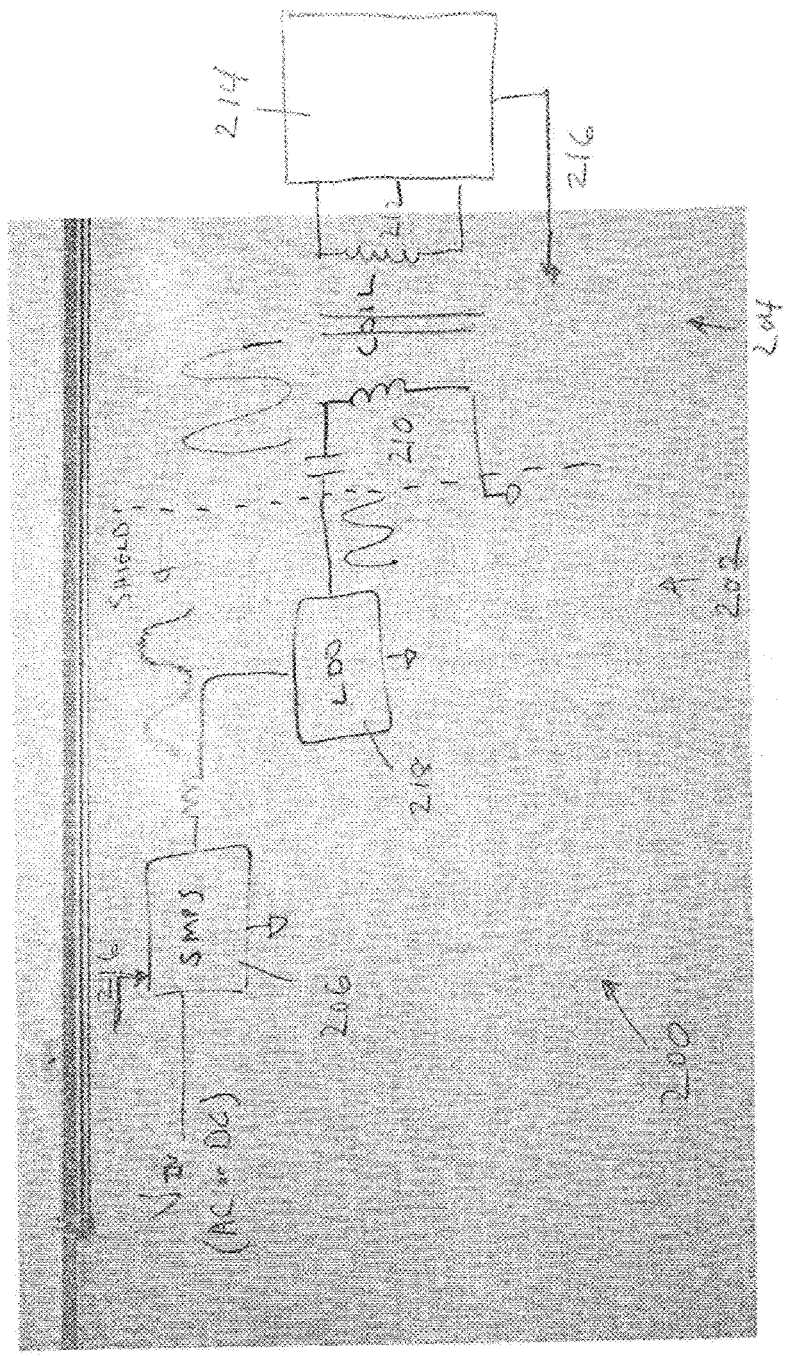
FIG. 2 is a simplified schematic diagram of a coupled inductor power transfer system illustrating an example of a preferred embodiment of the invention.

FIG. 2 is an example of a coupled inductor power transfer system 200 in accordance with a preferred embodiment of the invention. The system 200 includes a Class G amplifier primary side 202 for providing power to a secondary side 204 receiver 214. On the primary side 202, a Switched Mode Power Supply (SMPS) 206 is provided for producing a sine wave output to the primary side inductor coil 210. A Low Drop Out (LDO) regulator 218 acts as a filter to minimize electromagnetic interference (EMI) at the output. As in the alternative preferred embodiment described with reference to FIG. 1, the sine wave generator, i.e., SMPS driver 206, is configured to be adjustable in terms of frequency and amplitude in order to adjust transmissions to the secondary side 204. As in the above example, suitable startup circuitry (not shown) may also be provided in order to allow the system 200 to achieve appropriate bias levels prior to driving the primary side inductor coil 210, providing similar advantages. The secondary side 204 includes an inductor 212 coupled to the primary side inductor 210 for receiving the sine wave output of the primary side 202. Preferably, the secondary side 204 also includes circuitry 214 suitable for generating feedback signals 216 such as power levels, load levels, and frequency, for use in making adjustments to the output of the power supply 206.

Figure 3:
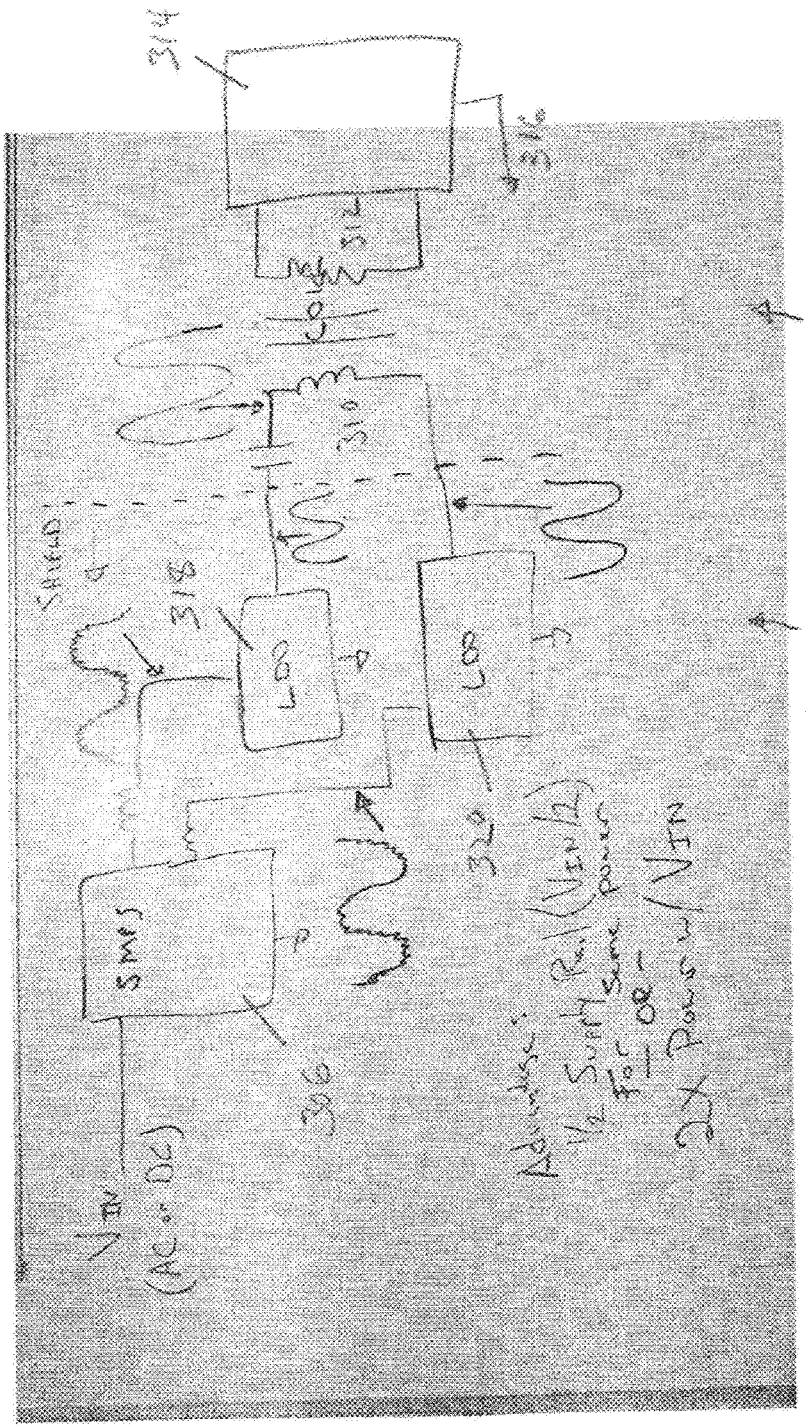
FIG. 3 is a simplified schematic diagram of a coupled inductor power transfer system illustrating an example of a preferred embodiment of the invention.

FIG. 3 is a diagram of a coupled inductor power transfer system 300 in accordance with an exemplary preferred embodiment of the invention. The system 300 includes a Class G amplifier primary side 302 for providing power to a secondary side 304 receiver 314. On the primary side 302, a Switched Mode Power Supply (SMPS) 306 is provided for producing sine wave outputs to the primary side inductor coil 310. Two LDOs 318, 320, provide differential outputs to the primary side coil 310. The LDOs 318, 320 act as filters to minimize electromagnetic interference (EMI) at the coil 310. In this system 300 configuration, the differential output may be used to provide approximately double the power output of the voltage supply, or may be used to provide a given output using approximately one half of the supply voltage along with correspondingly smaller components. The SMPS 306, is preferably adjustable as to output frequency and amplitude in order to adjust transmissions to the secondary side 304. As in the above examples, suitable startup circuitry (not shown) may also be provided in order to allow the system 300 to achieve appropriate bias levels prior to driving the primary side inductor coil 310, providing similar advantages. The secondary side 304 includes an inductor 312 coupled to the primary side inductor 310 for receiving the sine wave output of the primary side 302. Preferably, the secondary side 304 also includes circuitry 314 suitable for generating feedback signals 316 such as power levels, load levels, and frequency, for use in making adjustments to the output of the power supply 306.

Figure 4:
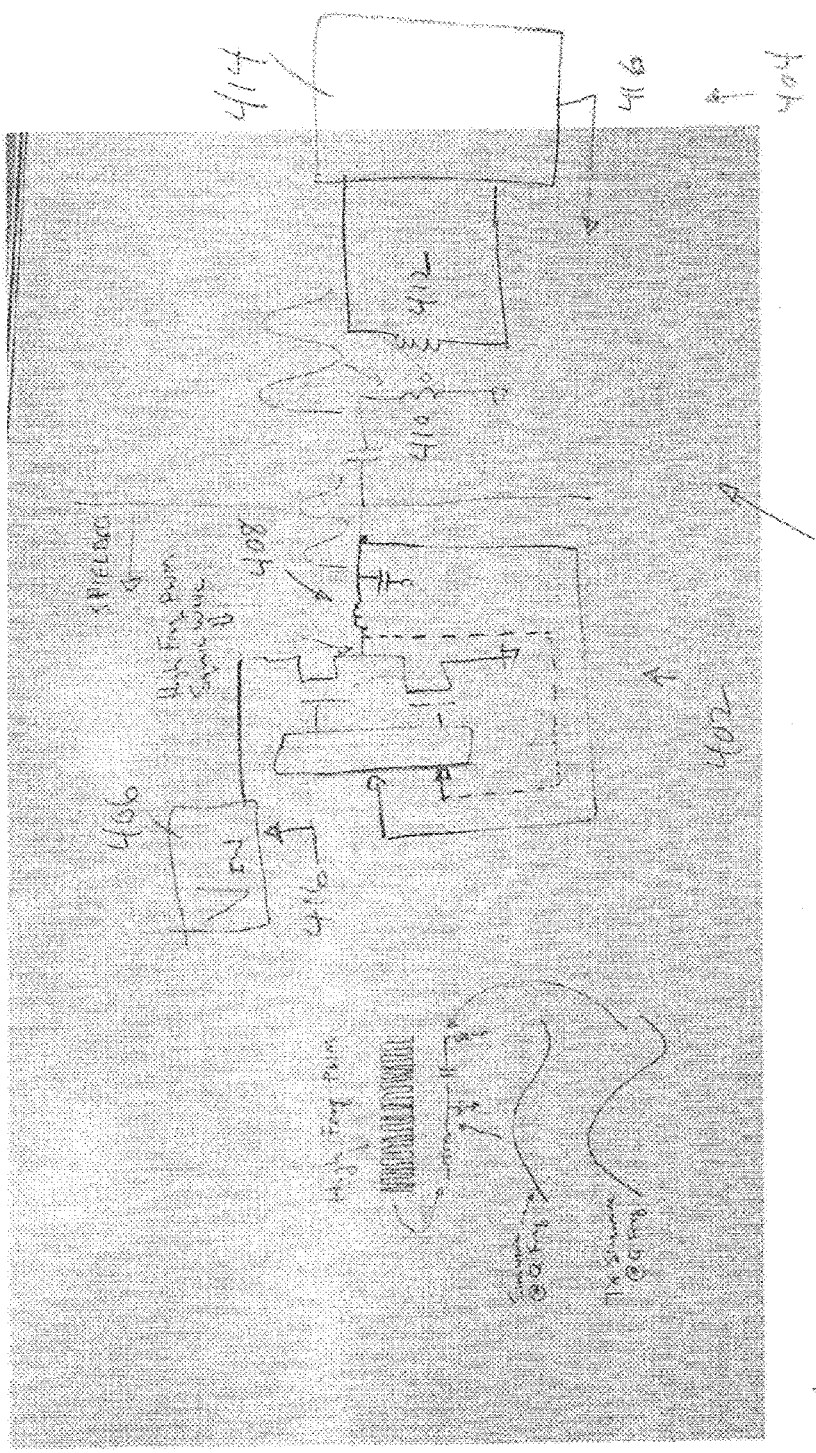
FIG. 4 is a simplified schematic diagram of a coupled inductor power transfer system illustrating an example of a preferred embodiment of the invention.

Now referring to FIG. 4, a diagram of a coupled inductor power transfer system 400 in accordance with an exemplary preferred embodiment of the invention is shown. The system 400 includes a Class D amplifier primary side 402 for providing power to a secondary side 404 receiver 414. On the primary side 402, a suitable power supply 406 provides a high frequency Pulse Width Modulated (PWM) signal, such as a square wave, is provided an LC filter 408 for producing a sine wave output to the primary side inductor coil 410. The primary side 402 is shielded from the secondary side 404 to minimize electromagnetic interference (EMI) at the coupled coils 410, 412. Suitable startup circuitry (not shown) may also be provided in order to allow the system 400 to achieve appropriate bias levels prior to driving the primary side inductor coil 410, providing similar advantages. The secondary side 404 includes an inductor 412 coupled to the primary side inductor 410 for receiving the sine wave output of the primary side 402. Preferably, the secondary side 404 also includes circuitry 414 suitable for generating feedback signals 416 such as power levels, load levels, and frequency, for use in making adjustments to the output of the power supply 406.

An additional advantage of the invented coupled inductor power transmission systems is the ability to transmit data as well as power. In one example, the PWM signal used in the system 400 of FIG. 4 can be modulated to include data. The modulation can be amplitude, duty cycle, frequency, or any other modulation technique. For example, the primary side 402 can be switched at two different frequencies. A selected number of pulses at the a lower frequency when detected at the secondary side 404 receiver 414 can represent a "one" and a selected number of pulses at a higher frequency when detected at the receiver 414 can represent a "zero". The closed loop on the primary side 402 will guarantee that the power coil waveform (which is much lower frequency than the primary side switching frequency) will not be distorted significantly by the embedded data.

In another example of data transmission in a coupled inductor power transmission system, two coils can be driven in parallel using the same driver. Using a different coil and/or capacitor combination will result in a different frequency response. The coil/capacitor combinations can be tuned such that one is optimized for power transmission at the sine wave frequency (lower frequency) and the other is optimized for data transmission at the driver switching frequency (higher frequency). The coils in this approach provide a filter to eliminate unwanted frequency content. A similar approach can be used on the receiver-side of this system. Two coils in parallel can be used and tuned to the appropriate frequencies. Such two-coil (on each side, actually four-coils counting the primary and secondary sides) systems can be implemented using combinations of the coupled coil systems shown and described herein without departure from the invention.

While the making and using of various exemplary embodiments of the invention are discussed herein, it should be appreciated that the present invention provides inventive concepts which can be embodied in a wide variety of specific contexts. It should be understood that the invention may be practiced with coupled inductor systems having communications and power transfer functionality, such as for example, battery chargers, AC/DC converters, power supplies, and associated apparatus. For purposes of clarity, detailed descriptions of functions, components, and systems familiar to those skilled in the applicable arts are not included. The methods and apparatus of the invention provide one or more advantages including but not limited to, data transfer capabilities, managed power transfer capabilities, and enhanced energy utilization and conservation attributes. While the invention has been described with reference to certain illustrative embodiments, those described herein are not intended to be construed in a limiting sense. For example, variations or combinations of steps or materials in the embodiments shown and described may be used in particular cases without departure from the invention. Various modifications and combinations of the illustrative embodiments as well as other advantages and embodiments of the invention will be apparent to persons skilled in the arts upon reference to the drawings, description, and claims.

We claim:

1. A coupled inductor system for wireless power transfer comprising:
   a primary side having a driver operably coupled to a primary side inductor, the driver comprising a sine wave generator and adapted to adjust the frequency and amplitude of the driver output to tune the driver to a system resonant frequency and maximize power transfer and a plurality of half H bridge drivers coupled to the primary side inductor;
   a secondary side having a secondary side inductor;
   wherein the secondary side is adapted for receiving a sine wave power signal transmitted by the driver through the primary side inductor.

2. The coupled inductor system for wireless power transfer according to claim 1 wherein the driver further comprises a Class G amplifier and a low drop out regulator coupled between the Class G amplifier and the primary side inductor.

3. The coupled inductor system for wireless power transfer according to claim 1 wherein the driver further comprises a Class D amplifier.

4. The coupled inductor system for wireless power transfer according to claim 1 wherein the driver further comprises a differential amplifier.

5. The coupled inductor system for wireless power transfer according to claim 1 wherein the secondary side further comprises circuitry for providing feedback to the primary side.

6. The coupled inductor system for wireless power transfer according to claim 1 further comprising feedback circuitry adapted to determine a selected frequency characteristic of the primary side and to operate the driver at the selected frequency.

7. The coupled inductor system for wireless power transfer according to claim 1 further comprising feedback circuitry adapted to determine the resonant frequency of the primary side and to operate the driver at the resonant frequency.

8. The coupled inductor system for wireless power transfer according to claim 1 wherein the primary side further comprises startup circuitry coupled between the sine wave generator and the primary side inductor, the startup circuitry configured to achieve a bias level prior to driving the primary side inductor.

9. The coupled inductor system for wireless power transfer according to claim 1 wherein the secondary side further comprises data receiving functionality.

10. The coupled inductor system for wireless power transfer according to claim 1 wherein the driver further comprises pulse width modulation data transmission functionality.

11. The coupled inductor system for wireless power transfer according to claim 1 wherein the primary side is adapted to control power transfer to the secondary side by adjusting the output amplitude of the driver.

12. A coupled inductor system for wireless power transfer comprising:
a primary side having a sine wave generator operably coupled to a driver, two or more power amplifiers, each operably coupled to the sine wave generator, logic operably coupled to the power amplifiers and half H bridge drivers coupled to the logic and the primary side inductor;
the driver operably coupled to a primary side inductor;
a secondary side having a secondary side inductor;
wherein the secondary side is adapted for receiving a sine wave power signal transmitted by the driver through the primary side inductor; and
circuitry whereby feedback from the secondary side is provided to the primary side for controlling the driver to adjust the frequency and amplitude of the driver output to tune the driver to a system resonant frequency and maximize power transfer.

13. The coupled inductor system for wireless power transfer according to claim 12 wherein the feedback circuitry s adapted to determine a selected frequency characteristic of the primary side and to operate the driver at the selected frequency.

14. The coupled inductor system for wireless power transfer according to claim 1 further comprising feedback circuitry adapted to determine the resonant frequency of the primary side and to operate the driver at the resonant frequency.

15. The coupled inductor system for wireless power transfer according to claim 12 wherein the driver further comprises a Class G amplifier.

16. The coupled inductor system for wireless power transfer according to claim 12 wherein the driver further comprises a Class D amplifier.

17. The coupled inductor system for wireless power transfer according to claim 12 wherein the driver further comprises a differential amplifier.

18. The coupled inductor system for wireless power transfer according to claim 12 wherein the secondary side further comprises data receiving functionality.

19. The coupled inductor system for wireless power transfer according to claim 12 wherein the driver further comprises pulse width modulation data transmission functionality.

20. A coupled inductor system for wireless power transfer comprising:
a primary side having a sine wave generator operably coupled to a Class G amplifier driver, the Class G amplifier operably coupled to a primary side inductor, logic operably coupled to the Class G amplifier, and half H bridge drivers coupled to the logic and the primary side inductor;
a secondary side having a secondary side inductor;
wherein the secondary side is adapted for receiving a sine wave power signal transmitted by the driver through the primary side inductor; and
circuitry whereby feedback from the secondary side is provided to the primary side for controlling the driver to adjust the frequency and amplitude of the driver output to tune the driver to a system resonant frequency and maximize power transfer.

21. A coupled inductor system for wireless power transfer comprising:
a primary side having a sine wave generator operably coupled to a Class D driver, the Class D amplifier operably coupled to a primary side inductor, logic operably coupled to the Class D amplifier, and half H bridge drivers coupled to the logic and the primary side inductor;
a secondary side having a secondary side inductor;
wherein the secondary side is adapted for receiving a sine wave power signal transmitted by the driver through the primary side inductor; and
circuitry whereby feedback from the secondary side is provided to the primary side for controlling the driver to adjust the frequency and amplitude of the driver output to tune the driver to a system resonant frequency and maximize power transfer.

22. The coupled inductor system for wireless power transfer according to claim 20 wherein the feedback circuitry is adapted to determine a selected frequency characteristic of the primary side and to operate the driver at the selected frequency.

23. The coupled inductor system for wireless power transfer according to claim 21 wherein the feedback circuitry is adapted to determine a selected frequency characteristic of the primary side and to operate the driver at the selected frequency.

* * * * *

UNITED STATES PATENT AND TRADEMARK OFFICE
CERTIFICATE OF CORRECTION

PATENT NO.        : 9,444,517 B2
APPLICATION NO.   : 13/309406
DATED             : September 13, 2016
INVENTOR(S)       : Ross Teggatz, Wayne Chen and Amer Atrash Page 1 of 1

It is certified that error appears in the above-identified patent and that said Letters Patent is hereby corrected as shown below:

On the Title Page

1. In Item (56), under "U.S. PATENT DOCUMENTS", in Column 2, Line 1, delete "Von Novak" and insert -- Von Novak et al. --, therefor.

2. In Item (56), under "U.S. PATENT DOCUMENTS", in Column 2, Line 7, delete "Jones" and insert -- Jones et al. --, therefor.

3. In Item (56), under "U.S. PATENT DOCUMENTS", in Column 2, Line 11, delete "Burgener" and insert -- Burgener et al. --, therefor.

In the Claims

4. In Column 7, Lines 33-34, in Claim 12, delete "the primary side inductor;" and insert -- a primary side inductor; --, therefor.

5. In Column 7, Line 35, in Claim 12, delete "a primary side inductor;" and insert -- the primary side inductor; --, therefor.

6. In Column 7, Line 47, in Claim 13, delete "s adapted" and insert -- is adapted --, therefor.

Signed and Sealed this
Twenty-third Day of May, 2017

Michelle K. Lee
*Director of the United States Patent and Trademark Office*